(No Model.)

2 Sheets—Sheet 1.

J. G. TRUMP.
CULTIVATOR.

No. 287,196.

Patented Oct. 23, 1883.

Attest;
T. Walter Fowler,
N. L. Collamer.

Inventor;
John G. Trump
per att'ys
A. W. Evans & Co.

(No Model.) 2 Sheets—Sheet 2.

J. G. TRUMP.
CULTIVATOR.

No. 287,196. Patented Oct. 23, 1883.

Attest:
S. Walter Fowler,
N. L. Collamer

Inventor;
John G. Trump
pr atty.
A. H. Evans & Co

UNITED STATES PATENT OFFICE.

JOHN G. TRUMP, OF RICHVILLE, MICHIGAN.

CULTIVATOR.

SPECIFICATION forming part of Letters Patent No. 287,196, dated October 23, 1883.

Application filed July 12, 1883. (No model.)

*To all whom it may concern:*

Be it known that I, JOHN G. TRUMP, of Richville, in the county of Tuscola and State of Michigan, have invented a new and useful Improvement in Cultivators; and I do hereby declare the following to be a full, clear, and exact description thereof, reference being had to the accompanying drawings, making a part of this specification, in which—

Figure 1:
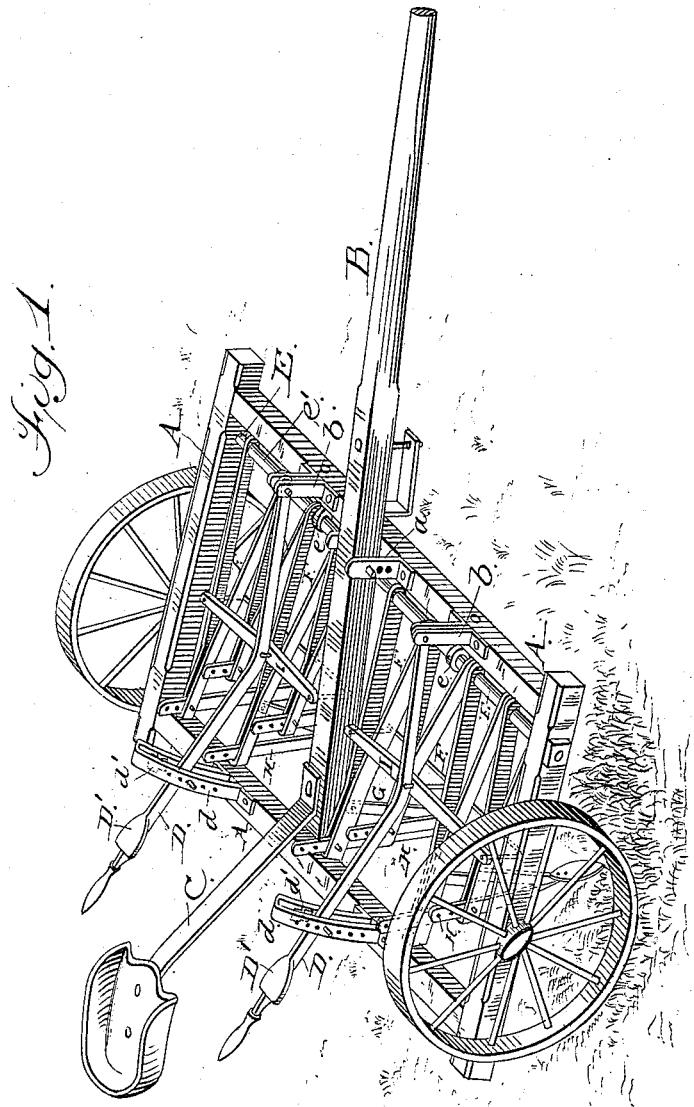
Figure 2:
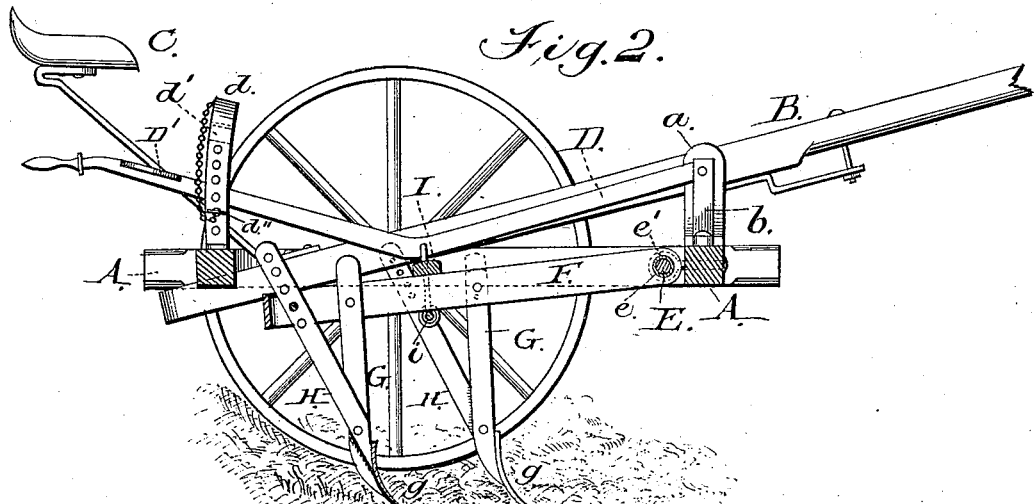
Figure 3:
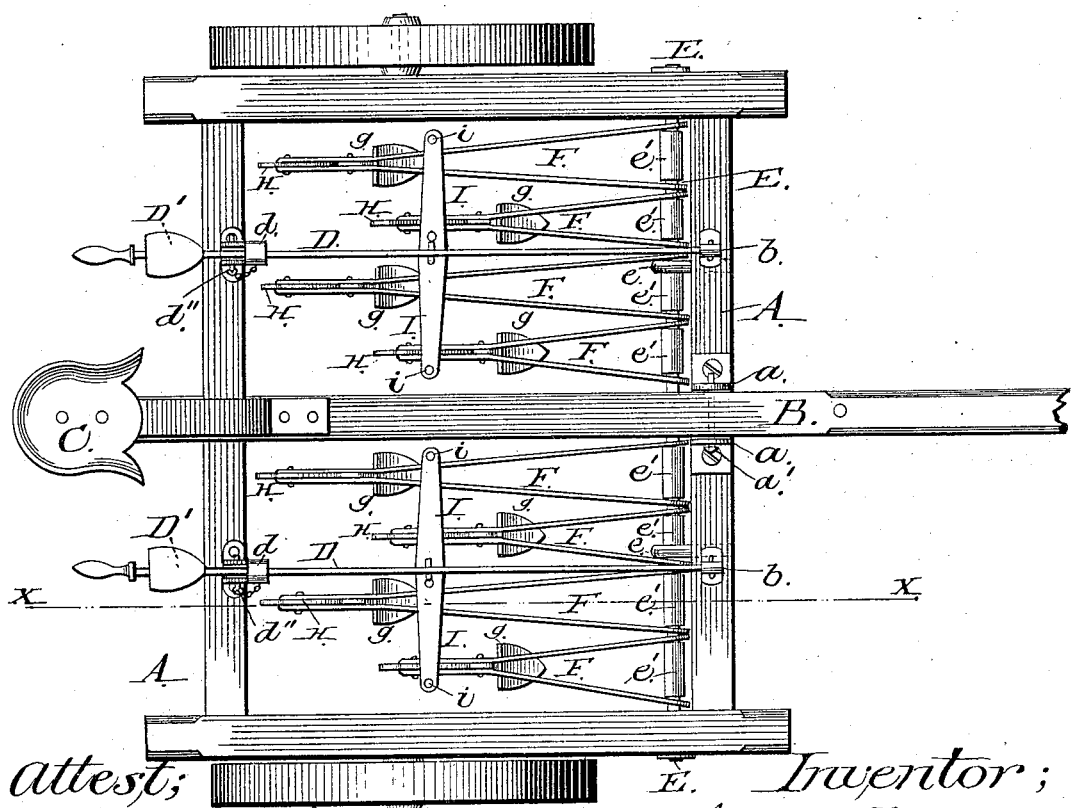

Figure 1 is a perspective view of a cultivator with my improvements attached. Fig. 2 is a longitudinal section on the line *x x* of Fig. 1. Fig. 3 is a plan view.

My invention relates more particularly to that class of cultivators known as "two-horse" cultivators; and it consists in the several combinations of devices hereinafter explained and claimed.

To enable others skilled in the art to make and use my invention, I will proceed to describe the exact manner in which I have carried it out.

In the drawings, A represents the wooden frame of the cultivator, on the forward beam of which are secured the standards *a*, between which the tongue B is pivoted, as is shown in Fig. 1. The rear of the tongue is depressed until it passes beneath and is secured to the under face of the rear beam. The standards *a* are perforated with holes to receive the bolt *a'*, by which the tongue is secured, and by which it may be adjusted to the height of any horse. To the upper face of the tongue, and just inside of the rear beam, is secured the driver's seat C. On each side of the standard *a* are the standards *b b*, to which are secured the ends of the levers D D, for raising the cultivator-teeth. On the rear beam, and to the right of the driver's seat, are secured the slotted standards *d d*, for holding the handles of the levers, as shown in Fig. 1. Inside of the slot in each of these levers is a catch or rest, *d'*, for holding the lever in place when the teeth are raised for transportation. By passing the lever above and resting it within the catch *d'*, and then introducing the pin *d''*, the lever is secured in an elevated position and the teeth are raised from the ground, ready for moving from field to field. The holes through the standards *d d* enable the adjustment of the levers, and consequently the teeth, to any desired depth of soil. If the soil be light, the adjusting-pin should be placed below the lever; but if the soil be stiff and refractory the pin should be inserted above the lever, so as to hold the teeth down to their work. On each lever I place the foot-rest D', for resting and relieving the driver, and enable him, when necessary, to control the levers by means of his feet.

Transversely through the frame A, and immediately in the rear of the front beam, I pass the metal bar or rod E, and secure it to the front beam by means of the eyebolts *e e*. To this rod are secured the forward ends of the drag-bars F, with a sleeve or washer, *e'*, between the drag-bars to keep them equally distant and in proper position. The drag-bars are of a peculiar construction, as shown in Fig. 3, being bifurcated, or forked or doubled, so as to form two legs, and each leg attached independently to the rod E. These drag-bars should be made of flat metal bars about two and one-half inches wide and about three-eighths of an inch thick. To the rear or free ends of these drag-bars I secure, by means of bolts, the standards G, provided with the cultivator-teeth *g*, and also the standard-brace H, provided with adjusting-holes, by means of which, with a pin, the pitch of the teeth may be easily regulated as desired. The pin may be made of wood or yielding material, so that when the teeth strike a stone or root with force sufficient to damage the cultivator the wooden pin will first yield and then protect the teeth against damage.

The construction of my cultivator, as described, which enables me to place the teeth in a line with the center of the wheels, thus giving a more uniform depth with the teeth at all times, is an essential feature in my present invention.

Attached to about the central point of each lever is a wooden bar, I, extending across four of the drag-bars, to assist in holding the teeth in the ground, and provided with a metal rod, *i*, attached at each end of the bar and passing around and below the four drag-bars, whereby, by raising a lever, a series of four or any other number of the drag-bars, with their standards and teeth, may be raised independently of the drag-bars attached to the other lever. It is evident that by this construction either series of cultivator-teeth may be made to operate independently of the other, or they can all be brought into play at the same time. Either section can be raised from the ground while the other is at work, and as the drag-bars are independently connected with the rod E each bar plays up and down on the uneven surface of the soil, and thus the rough and irregular ground can be cultivated evenly and at equal depth.

Having thus explained my invention, what I claim as new, and desire to secure by Letters Patent, is—

The lever D, in combination with the wooden bars I and metal rod $i$, drag-bars F, standards G, braces H, and teeth $q$, all constructed to operate substantially as and for the purpose herein described.

JOHN G. TRUMP.

Witnesses:
E. H. TAYLOR,
GEO. M. SAYLES.